United States Patent [19]
Satoh et al.

[11] Patent Number: 5,168,998
[45] Date of Patent: Dec. 8, 1992

[54] CASING FOR RECEIVING A MAGNETIC TAPE CASSETTE

[75] Inventors: Takateru Satoh; Tatsuo Fujii; Haruo Shiba; Kimio Tanaka; Noboru Uemura, all of Tokyo, Japan

[73] Assignee: TDK Corporation, Tokyo, Japan

[21] Appl. No.: 796,379

[22] Filed: Nov. 22, 1991

[30] Foreign Application Priority Data

| Nov. 20, 1990 | [JP] | Japan | 2-121754[U] |
| Nov. 22, 1990 | [JP] | Japan | 2-121755[U] |
| Nov. 22, 1990 | [JP] | Japan | 2-121756[U] |
| Nov. 22, 1990 | [JP] | Japan | 2-121757[U] |

[51] Int. Cl.$^5$ .................... B65D 85/672; B65D 43/16
[52] U.S. Cl. ........................ 206/387; 206/4; 206/459.5
[58] Field of Search ............... 206/387, 459

[56] References Cited

U.S. PATENT DOCUMENTS

| 3,620,361 | 11/1971 | Fugiwara et al. | 206/387 |
| 4,026,615 | 5/1977 | Tazaki et al. | 206/387 X |
| 4,235,334 | 11/1980 | Ahn et al. | 206/387 |
| 4,492,417 | 1/1985 | Saito et al. | 206/387 |
| 4,523,680 | 6/1985 | Saito et al. | 206/387 |

FOREIGN PATENT DOCUMENTS

1034848 7/1966 United Kingdom ............... 206/387

Primary Examiner—William I. Price
Attorney, Agent, or Firm—Oblon, Spivak, McClelland, Maier & Neustadt

[57] ABSTRACT

A casing for receiving a magnetic tape cassette comprises a transparent or semi-transparent casing main body 1 adapted to receive therein a magnetic tape cassette and a cover 3 pivotally supported by the casing main body by way of hinges 2, wherein a rib 10 for restricting the movement of the magnetic tape cassette in the direction of thickness of the casing main body 1 and a rib 9 for restricting the movement of the cassette in the longer side direction of the casing main body 1 are formed in the inner wall at a corner portion of the cover member.

11 Claims, 9 Drawing Sheets

CASING FOR RECEIVING A MAGNETIC TAPE CASSETTE

BACKGROUND OF THE INVENTION

1. Field of the Invention

The present invention relates to a casing for receiving and storing a magnetic tape cassette in which a tape such as a magnetic tape is wound.

2. Discussion of the Related Art

Magnetic tape cassettes are generally put in casings for facilitating sales and storage. These casings can be transparent casings which have a rectangular casing main body adapted to receive therein a magnetic tape cassette and a cover member which is pivotally attached to the casing main body by means of a hinge means, wherein index cards in a folded form are received in the casing.

A conventional casing for receiving a magnetic tape cassette has the following drawbacks. Since the casing was of a front open type wherein the cover was turned from the front side toward back side, it had a number of holding ribs formed inside the three side walls; a front wall and both side walls, so as not to easily cause undesired movement of the tape cassette in the casing. Accordingly, the ribs were seen from the outside whereby the appearance of the casing was not good. Further, the dragging of the tape cassette, when the tape cassette was extracted from the casing, was easily resulted in the positional relationship of the ribs to projections which were for preventing hubs from rotating.

SUMMARY OF THE INVENTION

It is an object of the present invention to provide a casing for receiving a magnetic tape cassette which provides an excellent state of holding of the magnetic tape cassette in the casing; can reduce the number of the holding ribs to thereby provide good appearance of the casing; allows the insertion and extraction of the magnetic tape cassette safely; and allows easy insertion and extraction of the tape cassette without any interference of the ribs in the casing.

According to the present invention, there is provided a casing for receiving a magnetic tape cassette comprising a transparent or semi-transparent casing main body 1 adapted to receive therein a magnetic tape cassette and a cover member 3 pivotally supported by the casing main body by means of a hinge means 2 provided at one side of the longer side direction of it, characterized in that a rib 10 for restricting the movement of the magnetic tape cassette in the direction of thickness of the casing main body 1 and a rib 9 for restricting the movement of the cassette in the longer side direction of the casing main body 1 are formed in the inner wall at a corner portion of the cover member.

DESCRIPTION OF THE PREFERRED EMBODIMENTS

Preferred embodiments of the casing for receiving a magnetic tape cassette according to the present invention will be described. A first embodiment of the present invention will be described with reference to FIGS. 1 through 12.

Reference numeral 1 designates a casing main body made of a transparent or semi-transparent material which has a rectangular prism shape so as to receive a magnetic tape cassette. A cover member 3 is pivotally attached to the casing main body 1 by means of a hinge means 2 so that the cover member 3 is opened and closed around the hinge means 2. An index card 4 having folded portions which are in contact with at least one of the projection walls and the bottom surface of the case main body 1 is received in the main body 1.

At a corner portion of the inside of the cover member 3 is provided a rib 10 for restricting the movement of a magnetic tape cassette in the direction of thickness of the casing main body 1, and a rib 9 for restricting the movement of the magnetic tape cassette in the longer side direction of the casing main body 1, when the magnetic tape cassette is received in the casing main body 1.

A pair of detents 5 which function as a withdrawal prevention and engaging means is formed in the casing main body 1 so as to be in contact with an edge or an end face of the index card 4 whereby the movement of the index card 4 toward the opening of the casing main body can be restricted. The ribs 9, 10 are formed inside the cover member 3 bridging between a top wall $3_4$ and a side wall $3_3$ near a corner portion defined by a rear wall $3_2$ and a side wall $3_3$. The rib 9 functions to restrict the movement of a magnetic tape cassette in the longer
} side direction of the casing main body 1 and the rib 10 functions to restrict the movement of the magnetic tape cassette in the direction of thickness of the casing main body 1. The ribs 9 and 10 can avoid undesired movement of the magnetic tape cassette in the casing main body 1 in association with front and rear walls $1_1$ and $1_2$ of the casing main body 1 when the tape cassette is inserted in the casing main body 1 and the cover member 3 is fitted to it. In this specification, the term front wall means the wall at the closer side and the rear wall means the wall at the remoter side in the drawings (in particularly perspective views).

The casing main body 1 comprises a rectangular bottom wall $1_5$, an opening $1_4$ formed at a shorter side of it, front and rear walls $1_2$ and $1_2$ formed at its longer sides extending from the end opposite the opening to the vicinity of the opening $1_4$, and a side wall $1_3$ formed at the other shorter side to connect both ends of the front and rear walls $1_1$ and $1_2$.

The cover member 3 comprises a rectangular top wall $3_4$, front and rear walls $3_1$ and $3_2$ formed at its longer sides and a side wall $3_3$ formed at its one shorter side, the other shorter side being formed as an opening $1_4$. The cover member is attached to the casing main body 1 by means of a pair of hinges 2 so that the cover member 3 can be opened and closed in the lateral direction. The side wall $3_3$ of the cover member 3 corresponds to the opening $1_4$ of the casing main body. Namely, the hinges 2 are respectively provided in the front and rear walls $1_1$ and $1_2$ at positions near the side wall $1_3$ of the casing main body 1.

The casing main body 1 has a container-like portion at which a top wall $1_6$ is formed at the side of the side wall $1_3$, whereby the magnetic tape cassette can be easily inserted and held in the casing main body.

The index card 4 comprises a rectangular bottom portion $4_4$, and a side portion $4_3$, a front portion $4_1$ and/or a rear portion $4_2$ wherein the side portion $4_3$ and the front portion $4_1$ and the rear portion $4_2$ are folded at a right angle along each side of the bottom portion $4_4$, whereby the index card 4 can be seen from three or four different directions of the casing main body when the index card 4 is put in the casing main body. The index card is provided with slits 14 in the side portion $4_3$ so that the detents 5 are engaged with the slits 14 when the index card 4 is inserted in the casing main body 1. A single slit 14 may be formed in the side portion $4_3$. Instead of the slits or in addition to the slits 14, notches 15 may be formed in the front and rear portions $4_1$ and $4_2$ respectively so that they engage with the detents 5. Thus, when the index card 4 is inserted in the casing main body 1, it can be easily inserted so that the side portion $4_3$ is in close-contact with the side wall $1_3$ because the slits 14 are provided even when the side portion $4_3$ strikes the detents 5, and it is restricted against the movement in the opposite direction of the index card 4. Thus, the slits 14 perform a withdrawal prevention function.

The detent 5 may be a pin having a shoulder portion formed in a supporting shaft in the hinge 2. The shoulder pin may be fixed to the cover member 3 or it may be fitted to a pin hole $2_1$ in the casing main body 1. In any case, it is sufficient that the detent 5 can be in contact with the inner surface of the side portion $4_3$ of the index card 4. Alternatively, the detent 5 may be of a slanted projection type having an angle of inclination, the projection extending to the inner surface of the front wall $1_1$ and/or the rear wall $1_2$ of the casing main body. In this case, the hinge 2 is unnecessary.

Figure 1:
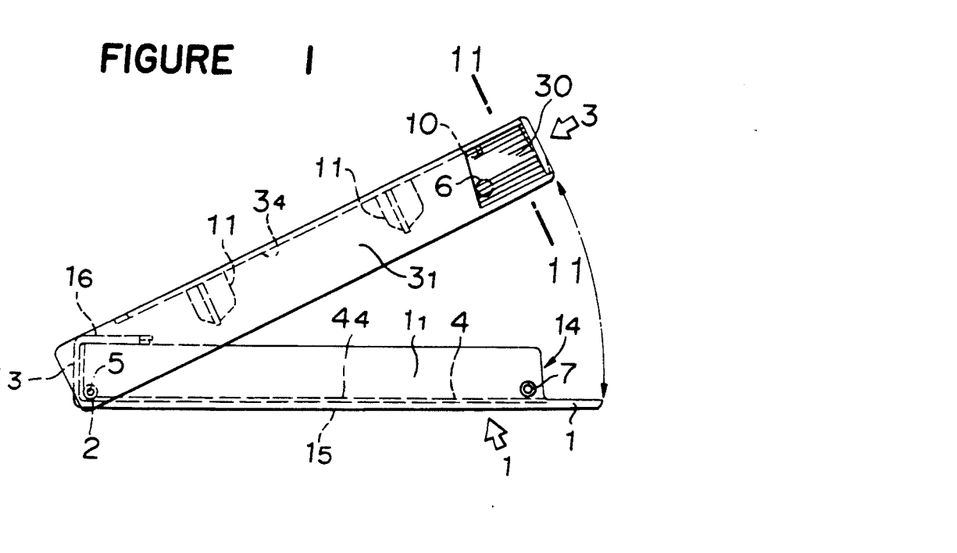
FIG. 1 is a front view of the casing for receiving a magnetic tape cassette in a developed state according to an embodiment of the present invention.
Figure 2:
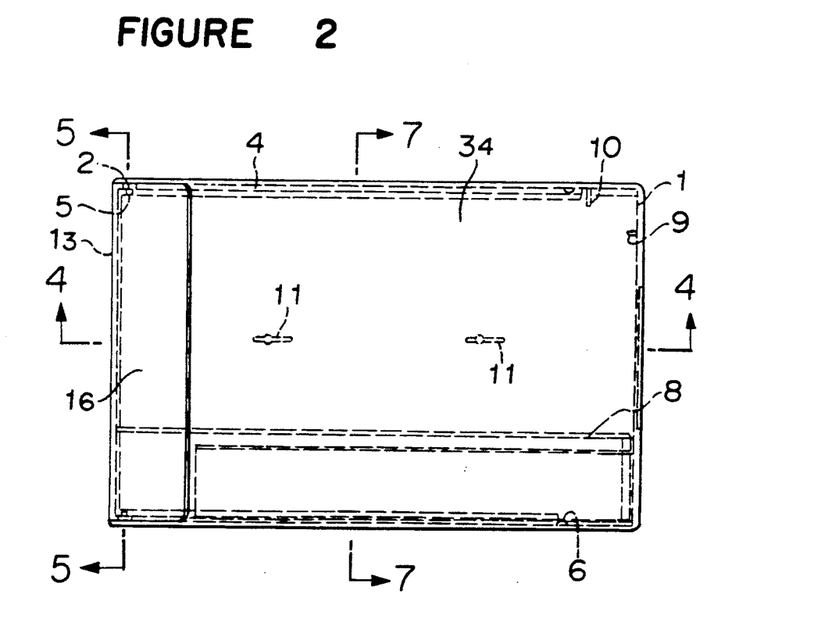
FIG. 2 is a plane view of the casing as shown in FIG. 1 in a closed state.
Figure 3:
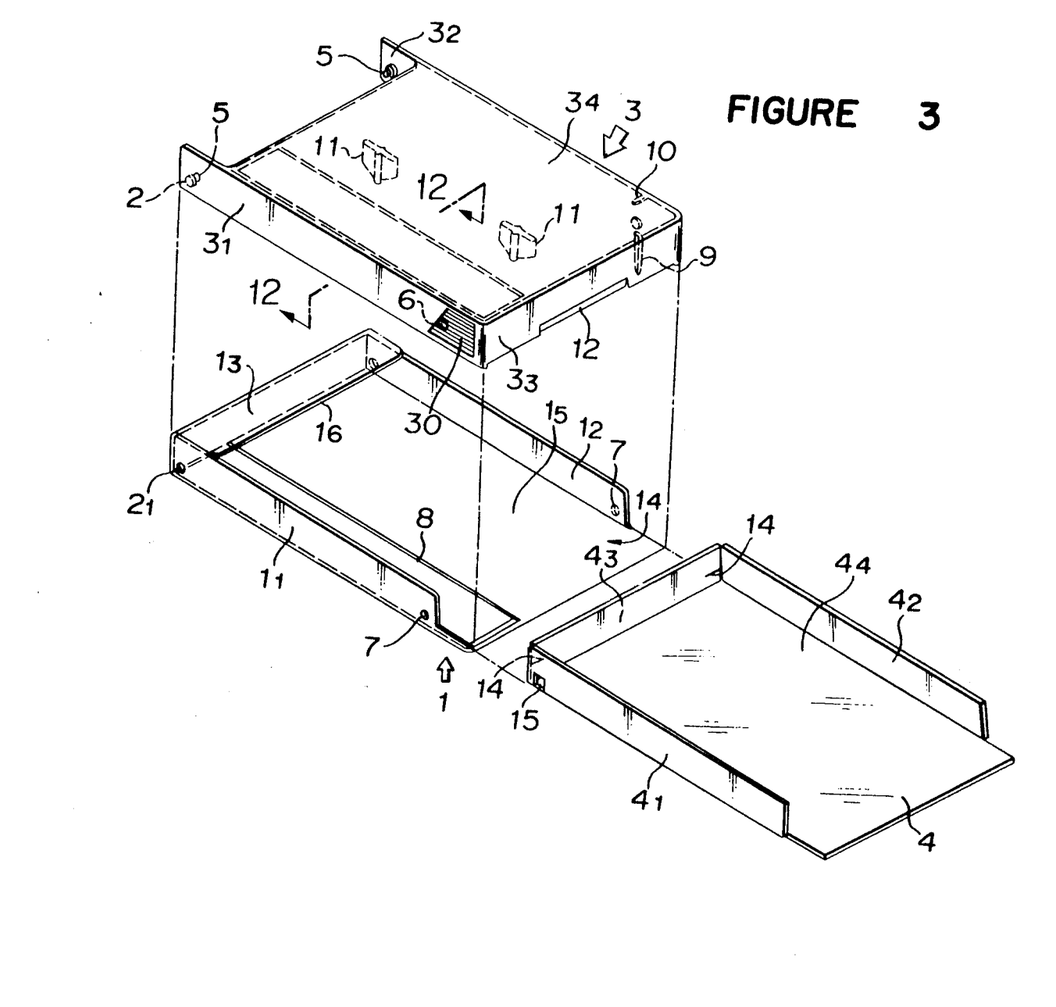
FIG. 3 is a perspective view in a disassembled state of the casing shown in FIG. 1.
Figure 4:
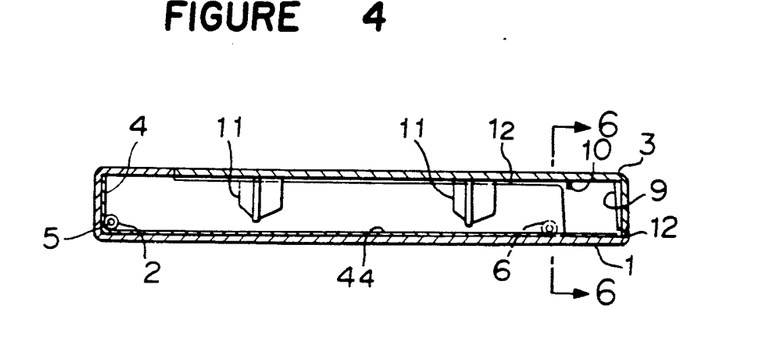
FIG. 4 is a cross-sectional view taken along a line 4—4 in FIG. 2.
Figures 5, 6:
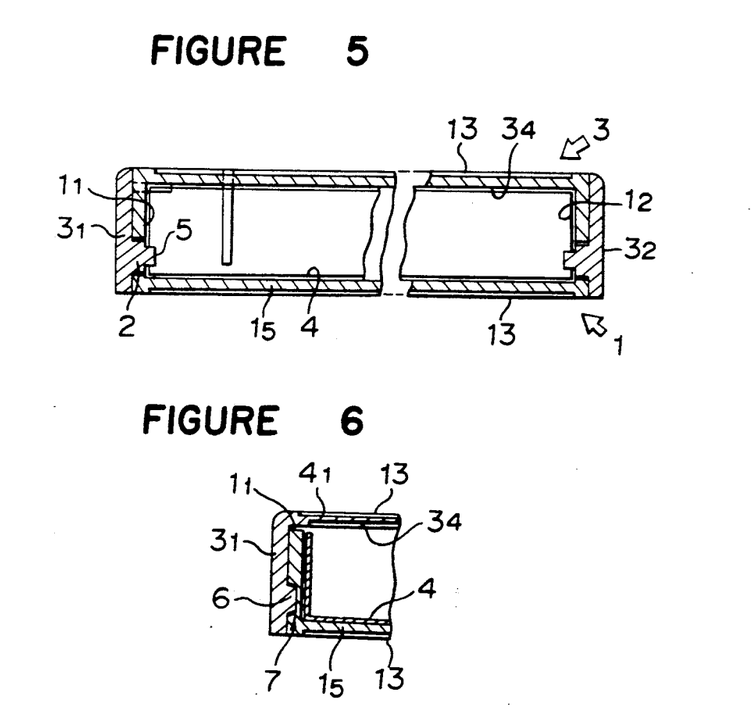
FIG. 5 is an enlarged cross-sectional view taken along a line 5—5 in FIG. 2.
FIG. 6 is an enlarged cross-sectional view taken along a line 6—6 in FIG. 4.
Figure 7:
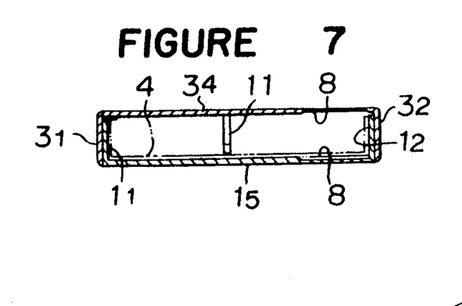
FIG. 7 is a cross-sectional view taken along a line 7—7 in FIG. 2.
Figure 8:
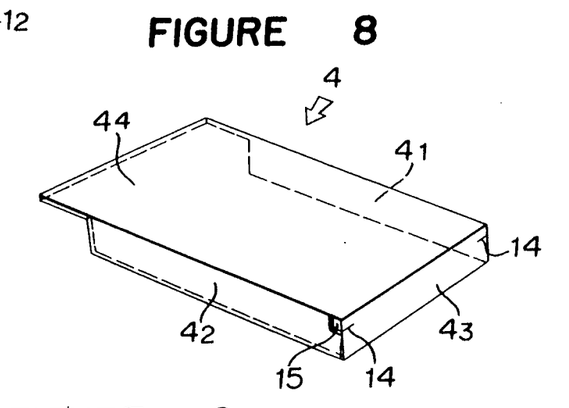
FIG. 8 is a perspective view of an index card to be received in the casing as shown in FIG. 1, the index card being viewed from the bottom direction.
Figure 9:
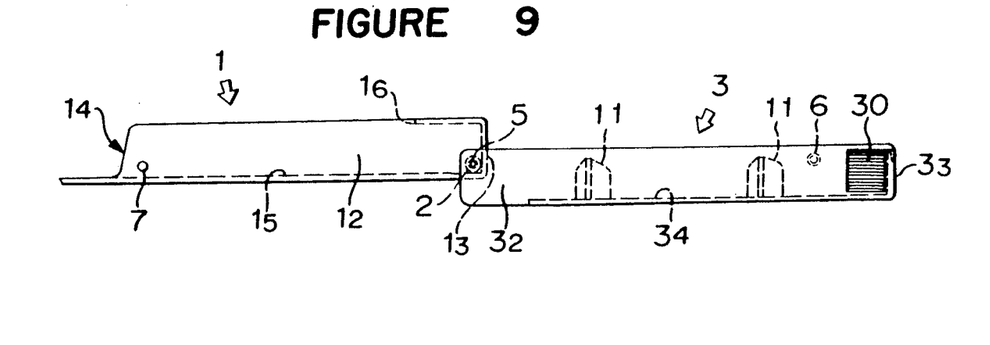
FIG. 9 is a side view in a developed state of the casing shown in FIG. 1.
Figure 11:
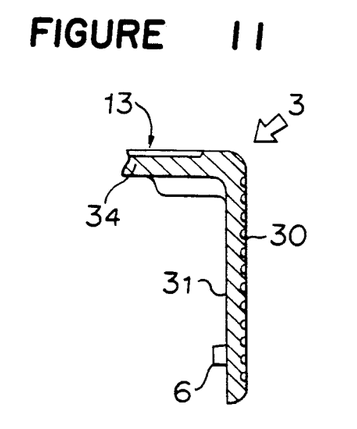
FIG. 11 is an enlarged cross-sectional view partly broken taken along a line 11—11 in FIG. 1.
Figure 12:
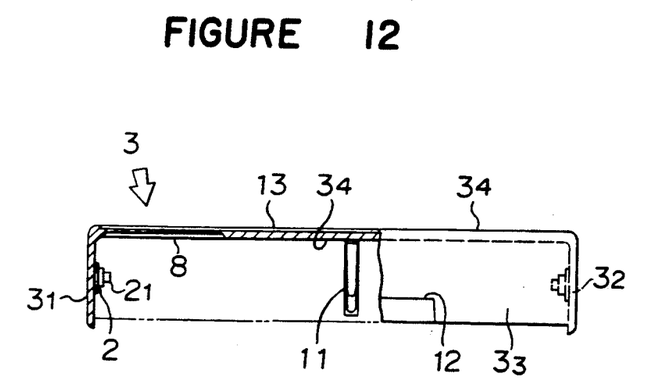
FIG. 12 is an enlarged cross-sectional view taken along a line 12—12 in FIG. 3.
Figure 13:
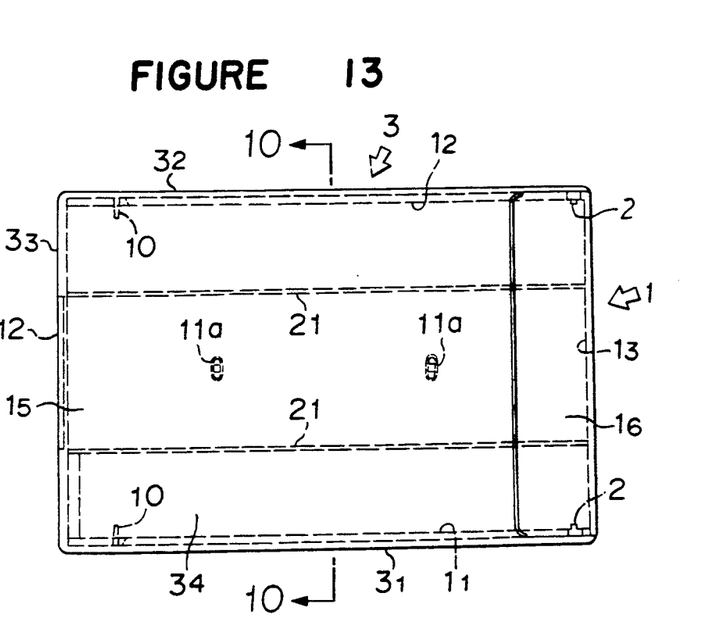
FIG. 13 is a plane view of another embodiment of the casing for receiving a magnetic tape cassette according to the present invention.
Figures 14, 15:
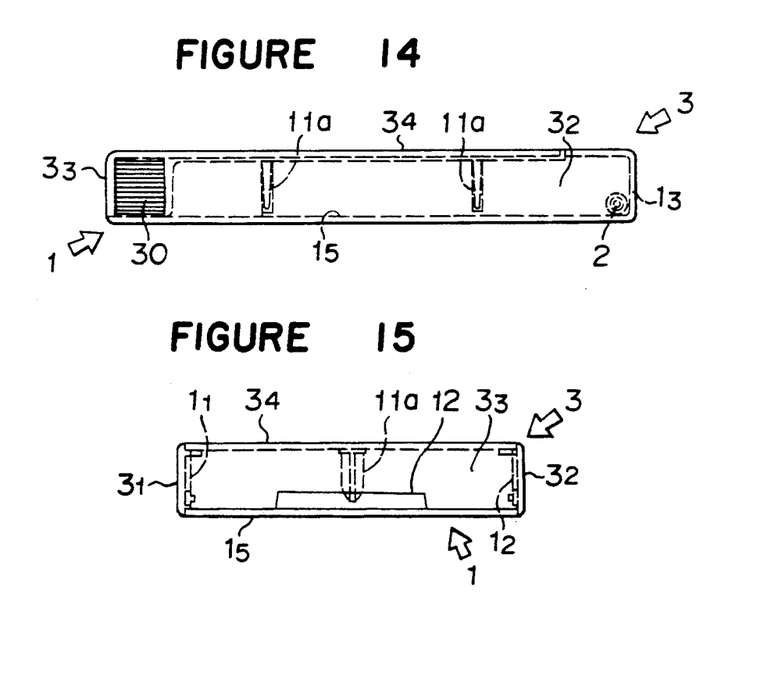
FIG. 14 is a front view of the casing shown in FIG. 13.
FIG. 15 is a side view of the casing.
Figures 16, 17:
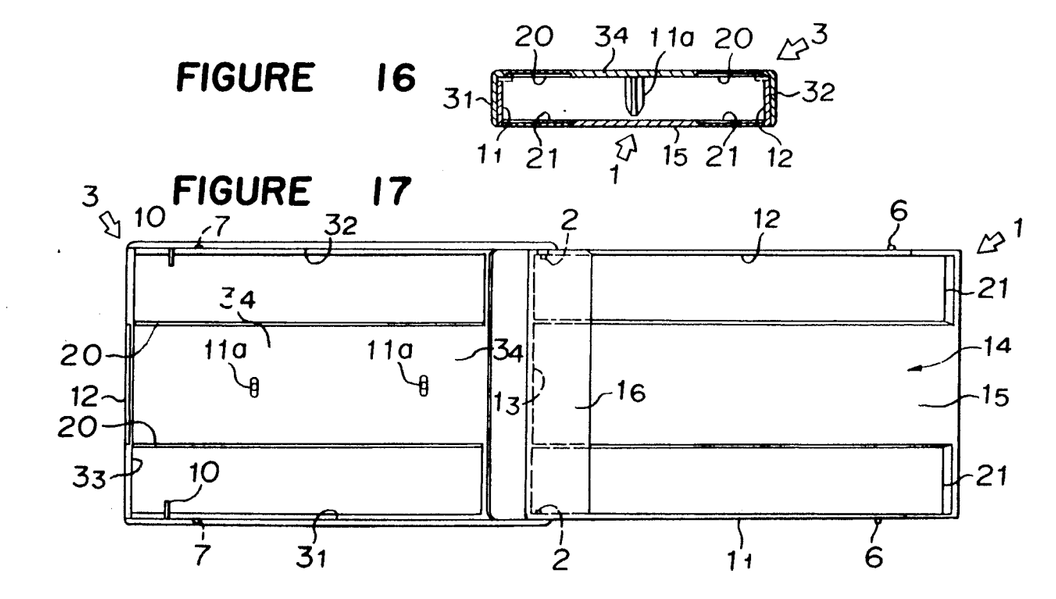
FIG. 16 is a cross-sectional view taken along a line 10—10 in FIG. 13.
FIG. 17 is a plane view in a developed state of the casing shown in FIG. 13.
Figure 18:
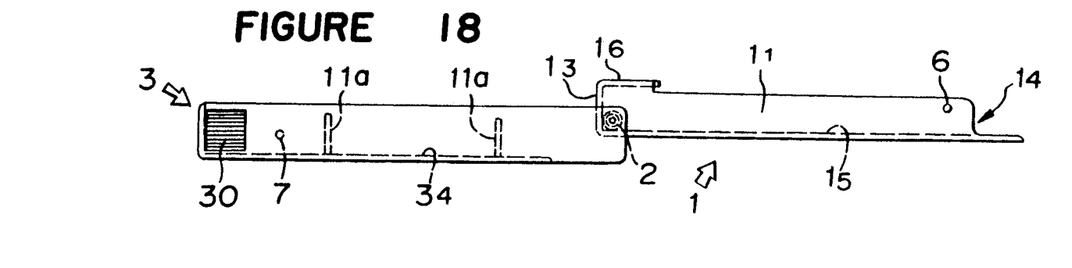
FIG. 18 is a front view of the casing shown in FIG. 17.
Figures 19, 20:
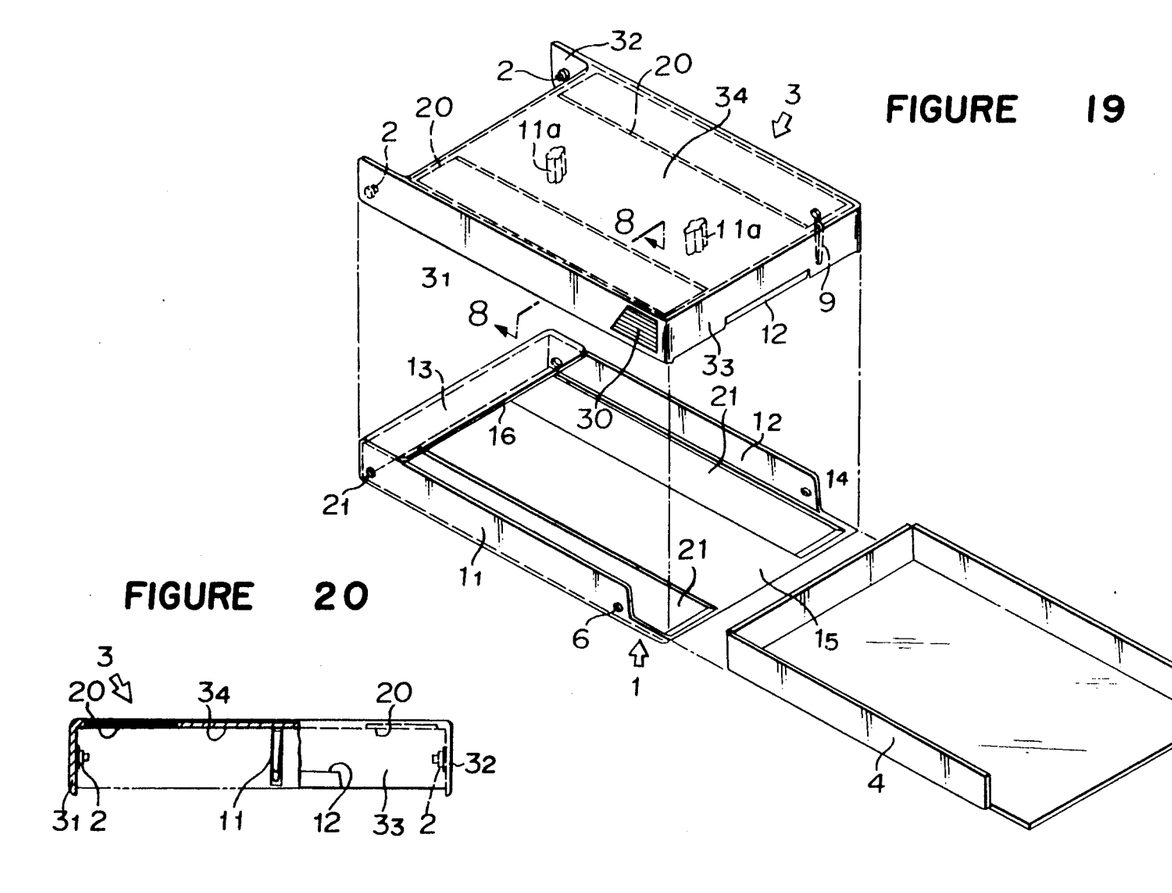
FIG. 19 is a perspective view in a disassembled state of the casing shown in FIG. 13.
FIG. 20 is a cross-sectional view taken along a line 8—8 in FIG. 19.

Projections 6 and recesses 7, which perform a locking function by mutual fitting, are formed in the front and rear walls of the casing main body 1 and the cover member 3 at positions remote from the hinges 2. In FIGS. 3, 9 and 11, the recesses are formed in the casing main body and the projections are formed in the cover member 3. However, the recesses 7 may be formed in the cover member 3 and the projections 6 may be formed in the casing main body 1. The engaging means constituted by the projection and recess may be formed at a single position or plural positions in the casing main body 1 and the cover member 3 as far as they are formed at positions apart from the hinges to thereby assure the locking effect. In this case, the matching edge portion between the casing main body 1 and the cover member 3 may have an inlay portion so that the casing main body 1 and the cover member 3 can be fitted when the cover is closed. The projections 6 and the recesses 7 form an engaging portion or a stopper at a free end side of the cover member 3, remote from the hinges 2.

A finger-touch portion 30 is formed in the outer surface of each of the front and rear walls $3_1$ and $3_2$ at a position corresponding to the projections 6 and/or the recesses 7 of the cover member 3 and the casing main body 1. The finger-touch portion 30 has a pattern having an uneven surface which consists of a number of linear projection lines extending horizontally in parallel to each other. The finger-touch portion 30 functions as a non-slip portion. If necessary, a rib may be formed inside the finger-touch portion 30. Thus, the cover member 3 can be certainly locked to the casing main body, whereby the cover member 3 can be prevented from easily opening from the casing main body.

The projections 6 which are formed at the positions remote from the hinges 2 of the casing main body 1 are projected from the inner surface of the cover member 3 so that they can be easily fitted to the recesses 7 formed in the casing main body.

Thus, since the finger-touch portion is formed at the outer surface of the cover member and at positions apart from the hinges; the projections or the recesses are formed inside the cover member 3 and at positions corresponding to the finger-touch portion, and the projections or recesses are formed in the front and rear walls of the casing main body and at positions corresponding to the projections or the recesses formed in the cover member, the projections and the recesses or the rib formed in the casing main body and the cover member can be hidden, whereby the casing for receiving a magnetic tape cassette having excellent appearance can be provided.

A rectangular concave portion 8 is formed in each of the casing main body 1 and the cover member 3 so as to oppose each other so that the head house of a magnetic tape cassette can be fitted therein. The ribs 9, 10 for preventing undesired rotation of the magnetic tape cassette are formed inside the cover member so as not to interfere with a space defined by the rectangular concave portions 8. A pair of projections 11 are formed inside the cover member 3 so that the projections 11 can be inserted in the hub openings of the magnetic tape cassette.

In FIGS. 1 through 12, reference numeral $2_1$ designates an aperture for receiving the pin and the numeral 12 designates a finger-handling portion formed in the outer surface of the side wall of the cover member 3 to as to form a slanting surface. Numeral 13 designates a recessed surface portion formed in the outer surface of the bottom wall $1_5$ of the casing main body 1 and the outer surface of the top wall $3_4$ of the cover member 3. The recessed surface portion 13 prevents flaws from occurring by slide contacting.

When a magnetic tape cassette is put in the casing main body 1 and the cover member 3 is closed to the casing main body 1, the position of the magnetic tape cassette in the casing main body 1 is restricted by the front wall $1_1$, the rear wall $1_2$, the rib 9 for restricting the longer side direction and the rib 10 for restricting the direction of the thickness of the casing main body, and the cover member 3 can be maintained in a locked state by means of the projections 6 and the recesses 7. Accordingly, a number of casings can be lined up in an upright state or can be stacked with each other while the index cards can be viewed from the outside.

Figure 10:
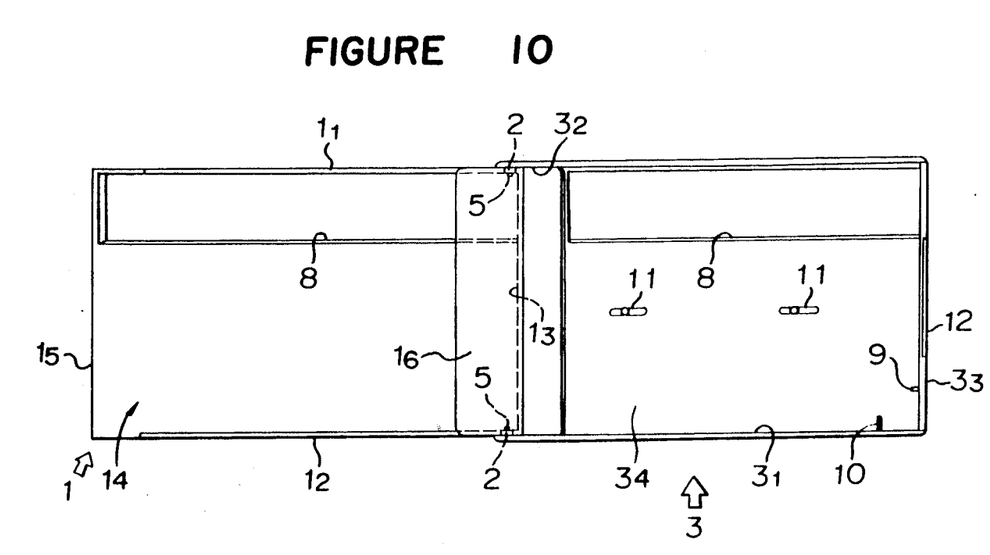
FIG. 10 is a plane view of the casing shown in FIG. 9.

When fingers touch the finger-touch portions 30 of the cover member 3 to raise it, the projections 6 are released from the recesses 7 and the cover member 3 can be turned around the hinges 2 so that the magnetic tape cassette can be exposed (FIGS. 9 and 10). When the magnetic tape cassette is drawn from the casing main body 1, the withdrawal of the index card 4 together with the magnetic tape cassette can be prevented since the index card 4 can be retained by the detent 5. Accordingly, handling of the casing is easy.

In the above-mentioned embodiment of the present invention, the casing for receiving a magnetic tape cassette comprising a transparent or a semi-transparent casing main body adapted to receive therein a magnetic tape cassette and a cover member pivotally connected to the casing main body by means of a hinge means, has a rib for restricting the movement of the tape cassette in the longer side direction and a rib for restricting the movement of the magnetic tape cassette in the direction of the thickness, the ribs being formed in an inner corner portion of the cover member. Accordingly, the magnetic tape cassette can be held in a good condition in the casing; the number of ribs for holding the magnetic tape cassette can be reduced so that the casing can provide good appearance; the insertion and withdrawal of the magnetic tape cassette can be safely carried out without interference with the ribs formed in the casing; and the index card can be seen from different directions of the casing while the trace of the ribs can be small, whereby freedom of the storage of the casings can be increased. Further, the handling of the casings can be easy; the quality of the casing can be improved; and they can be easily manufactured at a low cost.

With reference to FIGS. 13 through 20. The same reference numerals as FIGS. 1 through 12 designate the same or corresponding parts and therefore, description of these parts is omitted.

In FIGS. 13 through 20, a pair of projections 11a, 11a which prevent the rotation of the hubs of a magnetic tape cassette are formed inside the cover member 3. Rectangularly recessed portions 20, 20, 21 and 21 are formed in the inner surface of the casing main body and the cover member along the longer side of them respectively at symmetric positions with respect to the projections 11a, 11a for preventing the rotation of the hubs, as the center, so that the two pairs of recesses 20, 21 formed in the casing main body and the cover member are opposed to each other.

In the second embodiment of the present invention, rectangular recessed portions are formed in the inner surface of the casing main body and the cover member along their longer sides so as to form spaces for receiving the head house of a magnetic tape cassette, in addition to the structural features as described in the first embodiment. Accordingly, insertion of the magnetic tape cassette to the casing main body can be carried out without paying attention to the orientation of the head house, in addition to the advantages described in the first embodiment.

We claim:

1. A casing for receiving a magnetic tape cassette comprising a transparent or semi-transparent casing main body 1 adapted to receive therein a magnetic tape cassette and a cover member 3 pivotally supported by said casing main body by means of a hinge means 2 provided at one side of the longer side direction of it, characterized in that a rib 10 for restricting the movement of the magnetic tape cassette in the direction of thickness of the casing main body 1 and a rib 9 for restricting the movement of the cassette in the longer side direction of the casing main body 1 are formed in the inner wall at a corner portion of the cover member.

2. The casing for receiving a magnetic tape cassette according to claim 1, wherein said casing main body 1 comprises a rectangular bottom wall $1_4$, a side wall $1_3$ at a shorter side of the bottom wall $1_4$, an opening portion $1_4$ at the other shorter side, front and rear walls $1_1$ and $1_2$ at the opposing longer sides of the bottom wall, and said cover member 3 comprises a rectangular top wall $3_4$, front and rear walls $3_1$ and $3_2$ at the opposing longer sides of the top wall $3_4$ and at least one side wall $3_3$, wherein said cover member 3 is pivotally attached to said casing main body 1 by means of the hinge means 2 which is formed in the casing main body 1 at a position near the side wall $1_3$ of the casing main body 1.

3. The casing for receiving a magnetic tape cassette according to claim 1 or 2, wherein said ribs 9 and 10 are respectively formed inside the top wall $3_4$ and the side wall $3_3$ at positions near a corner portion which is defined by the rear wall $3_2$ and the side wall $3_3$ of said cover member 3.

4. The casing for receiving a magnetic tape cassette according to claim 1, wherein a detent 5 is formed in the casing main body 1 so as to be in contact with an edge or an end face of an index card to thereby restrict the movement of the index card toward the opening $1_4$ of the casing main body 1, and a slit 14 or a notch is formed in a side wall $4_3$ or side walls $4_3$ which rise from the index card whereby said detent 5 is engaged with said slit 14 or said notch.

5. The casing for receiving a magnetic tape cassette according to claim 4, wherein said detent 5 is a pin with a shoulder portion which projects from the pivotal shaft of the hinge means 2, said pin 5 being in contact with the inner surface of the side wall $4_3$ of the index card 4.

6. The casing for receiving a magnetic tape cassette according to claim 4 or 5, wherein said index card 4 is a folded body comprising a rectangular bottom portion $4_4$, a side portion $4_3$ folded along a shorter side of the bottom portion and a front portion $4_1$ and/or a rear portion $4_2$ folded along the longer sides of the bottom portion $4_4$, in which at least one side of the side portion $4_3$ is provided with a slit 14 or a notch into which the detent 5 is inserted.

7. The casing for receiving a magnetic tape cassette according to claim 4 or 5, wherein said index card 4 comprises a rectangular bottom portion $4_4$, a front portion $4_1$ and a rear portion $4_2$ which are folded along the longer sides of the bottom portion $4_4$, and a side portion $4_3$ folded along a shorter side of the bottom portion $4_4$, in which a notch 5 is formed in each of the front and rear portions $4_1$ and $4_2$ so as to receive the detent 5.

8. The casing for receiving a magnetic tape cassette according to claim 1, wherein finger-touch portions 30 are formed in the outer surface of the front and rear walls $3_1$ and $3_2$ of the cover member 3, which are the remotest from the hinge means 2; projections 6 or recesses are formed at the inside of the front and rear walls $3_1$ and $3_2$ of the cover member at positions corresponding to the finger-touch portions 30, and projections 7 or recesses are formed at the front and rear walls $1_1$ and $1_2$ of the casing main body 1 so that the projections 6 or the recesses come to engagement with each other when the cover member is closed to the casing main body.

9. The casing for receiving a magnetic tape cassette according to claim 8, wherein said finger-touch portions 30 have a pattern of uneven surface in which a number of linear projection lines extend horizontally in parallel to each other.

10. The casing for receiving a magnetic tape cassette according to claim 1, wherein a pair of projections 11a, 11a which prevent the rotation of hubs are formed inside the cover member 3 and rectangularly recessed portions 20, 20, 21 and 21 are formed in the inner surface of the casing main body and along the longer side of them and the cover member respectively at symmetric positions with respect to the projections as the center so that the recesses 20, 20, 21 and 21 provide a head house for the magnetic tape cassette.

11. The casing for receiving a magnetic tape cassette according to claim 10, wherein said casing main body 1 has a container-like portion which is defined by an opening $1_4$ at its one side, the side wall $1_3$ and the top wall $1_6$ of the casing main body.

* * * * *